(12) United States Patent
Loeshelle (10) Patent No.: US 11,521,384 B1
(45) Date of Patent: Dec. 6, 2022

(54) MONITORING SYSTEM INTEGRATION WITH AUGMENTED REALITY DEVICES

(71) Applicant: Alarm.com Incorporated, Tysons, VA (US)

(72) Inventor: Joel Loeshelle, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 19 days.

(21) Appl. No.: 16/906,181

(22) Filed: Jun. 19, 2020

Related U.S. Application Data

(60) Provisional application No. 62/869,370, filed on Jul. 1, 2019.

(51) Int. Cl.
| | |
|---|---|
| *G06T 19/00* | (2011.01) |
| *G06V 20/20* | (2022.01) |
| *H04L 12/28* | (2006.01) |
| *G06F 3/01* | (2006.01) |
| *G08B 25/01* | (2006.01) |

(52) U.S. Cl.
CPC .............. *G06V 20/20* (2022.01); *G06F 3/013* (2013.01); *G06T 19/006* (2013.01); *G08B 25/016* (2013.01); *H04L 12/282* (2013.01); *H04L 12/2827* (2013.01)

(58) Field of Classification Search
CPC ... G06K 9/00671; G06F 3/013; G06T 19/006; G08B 25/016; H04L 12/282; H04L 12/2827
See application file for complete search history.

(56) References Cited

U.S. PATENT DOCUMENTS

| 9,142,242 | B1 * | 9/2015 | Peters | G11B 7/00 |
| 2015/0088547 | A1 * | 3/2015 | Balram | G16H 40/67 |
| | | | | 705/3 |
| 2015/0346701 | A1 * | 12/2015 | Gordon | H04L 12/2809 |
| | | | | 700/275 |
| 2018/0130260 | A1 * | 5/2018 | Schmirler | G06T 19/006 |
| 2019/0107823 | A1 * | 4/2019 | Hoferer | G05B 19/409 |
| 2019/0391716 | A1 * | 12/2019 | Badr | G06K 9/00671 |

FOREIGN PATENT DOCUMENTS

WO   WO2016/202034   12/2016

\* cited by examiner

*Primary Examiner* — Chong Wu
(74) *Attorney, Agent, or Firm* — Fish & Richardson P.C.

(57) ABSTRACT

Method and apparatus for operating home appliances, the method includes identifying a home appliance in a field view of a camera of an augmented reality (AR) device; generating, based on the home appliance that was identified, a control interface to overlay on a screen of the AR device or to present within an augmented view of a user that carries the AR device; detecting a selection by the user of control options on the control interface; and triggering the home appliance to perform an operation based on the selection.

18 Claims, 5 Drawing Sheets

MONITORING SYSTEM INTEGRATION WITH AUGMENTED REALITY DEVICES

CROSS-REFERENCE TO RELATED APPLICATIONS

This application claims the benefit of U.S. Provisional Application No. 62/869,370, filed on Jul. 1, 2019, which is incorporated by reference in its entirety.

BACKGROUND

Augmented reality is an interactive experience of a real-world environment where the objects that reside in the real world are augmented by computer-generated perceptual information, sometimes across multiple sensory modalities, such as visual, auditory, haptic, somatosensory, and olfactory.

BRIEF DESCRIPTION OF THE DRAWINGS

Like reference numbers and designations in the various drawings indicate like elements.

DETAILED DESCRIPTION

Augmented reality provides an enhanced version of reality where a view of physical real-world environments as seen through a computing device are augmented with superimposed, computer-generated images, thus enhancing the user's view. In the case of augmented reality, graphics, sounds, and touch feedback are added into the view on the computing device to create an enhanced user experience.

Various electronic and electronic appliances in a smart home can bring home automation, efficient energy usage, and centralized control to a resident of the home. A smart home that associates an augmented reality device with various home electronic devices supports quick, silent and secure execution of control functions of the home electronic devices. A user can point an augmented reality device at a home electronic device, and the augmented reality application running on the augmented reality device recognizes the electronic device and offers an intuitive graphical interface to interact and operate the home electronic device. Using the augmented reality application, the user can operate a home electronic device with a quick, silent, and secure action, such as eye blinking and eyebrow twinkling, etc.

Figure 1:
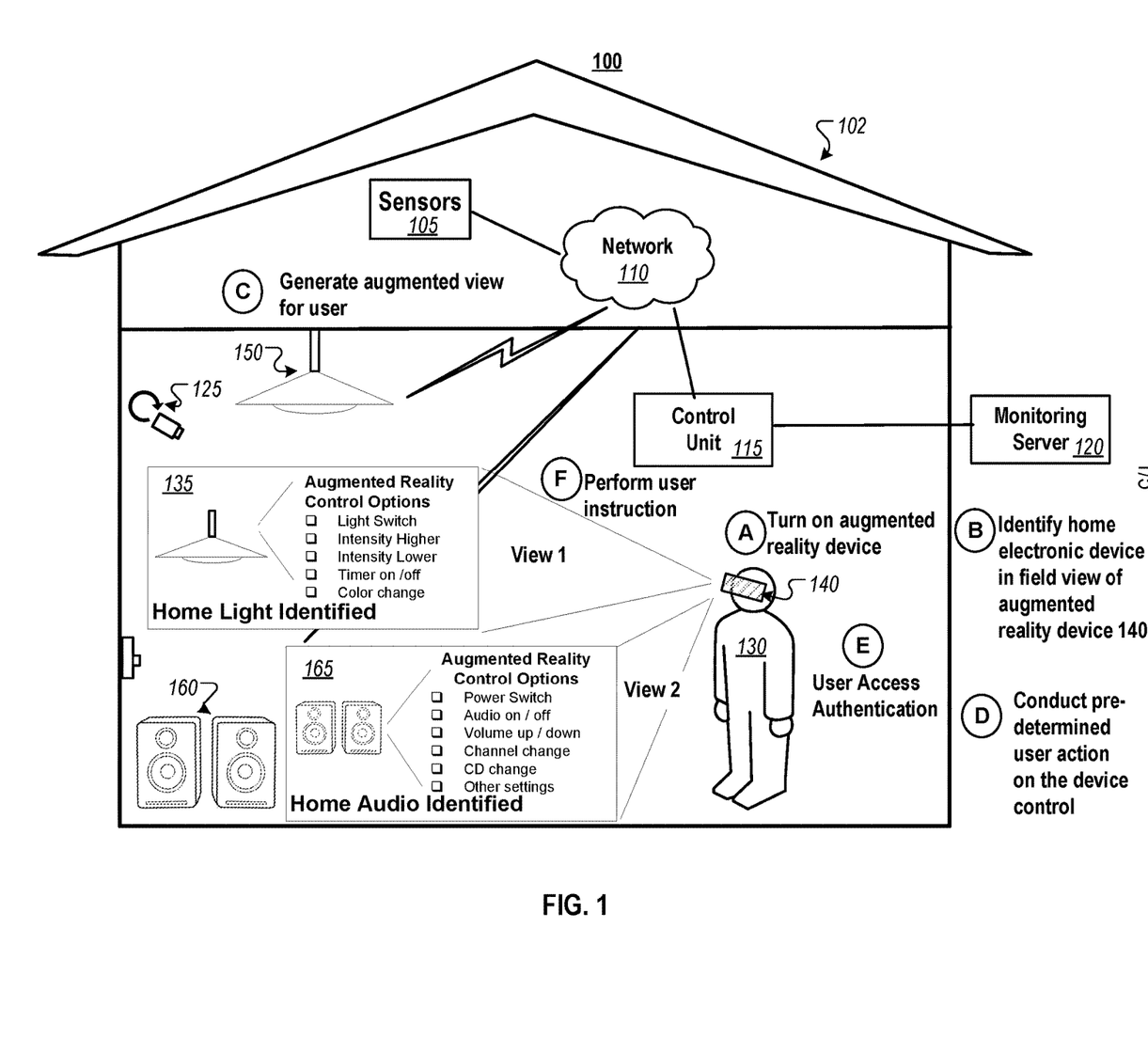
FIG. 1 is a diagram illustrating an example of a home electronic device control system that utilizes an augmented reality device used by the home resident.

FIG. 1 is a diagram illustrating an example of a home electronic device control system 100 that utilizes an augmented reality device used by the home resident. In FIG. 1, the property 102 is equipped with a home electronic device control system that includes various sensors 105, a network 110, a control unit 115, a monitoring server 120, camera 125, and an augmented reality device 140.

The sensors 105 may include sensors on a device that indicates usage of a home electronic device, for example, a sensor that indicates the ceiling light 150 is on. In another example, a sensor may indicate that the living room stereo system is on. The sensors 105 may include utility sensors that detect resource usage, for example, an energy sensor that detects usage of electric power or a sensor that detects gas usage. The sensors 105 may include microphones or other audio devices that detect audible sounds within the property 102. The sensors 105 may include temperature sensors, humidity sensors, airflow sensors, air quality detectors, or other sensors that monitor the climate or environment of an area of the home property 102.

In some implementations, the sensors 105 may detect and collect sensor data related to the activity of the resident 130. For example, the sensors 105 may capture motion data detecting movement in the property 102. Cameras 125 may record video data in and around the property 102. The electronic device sensors may collect data indicating that a ceiling light 150 has been turned on or off, and stereo system sensors may indicate that a home stereo system 160 is playing. The sensors 105 may communicate with an augmented reality device 140, for example an augmented reality headset or mobile phone, through the network 110.

The sensors 105 communicate with the control unit 115, possibly through a network 110. The network 110 may be any communication infrastructure that supports the electronic exchange of data between the control unit 115 and the sensors 105. The network 110 may include a local area network (LAN), a wide area network (WAN), the Internet, or other network topology. The network 105 may be any one or combination of wireless or wired networks and may include any one or more of Ethernet, cellular telephony, Bluetooth, and Wi-Fi technologies. Communications through the network 110 may be implemented through any one or combination of various protocols, including the 802.11 family of protocols, Bluetooth, Bluetooth LE, Z-Wave, ZigBee, GSM, 3G, 4G, 5G, LTE, or other custom or standard communication protocol. In some implementations, the network 105 may include optical data links. To support communications through the network 110, the sensors 105 and/or the control unit 115 may include communications modules, such as a modem, transceiver, modulator, or other hardware or software configured to enable the device to communicate electronic data through the network 105.

In some implementations, the control unit 115 may also communicate with an augmented reality device 140 that may be carried by the resident 130. The augmented reality device 140 may include a screen to augment image data captured by the camera of the device such that the image becomes an interactive environment. Augmented reality device also requires significant edge computer processing power and includes many components like a CPU, a GPU, memory, GPS chip and more.

There may be a monitoring server 120 may be located within or outside of the property 102 and in communication with the control unit 115. The monitoring server 120 may be, for instance, one or more computer systems, server systems, or other computing devices. In some implementations, the monitoring server 120 may be a cloud computing platform. The monitoring server 120 provides various monitoring services to the home electronic device control system 100.

For example, the monitoring server 120 may monitor the home property 102 for activity or alarm conditions, may provide notifications to the resident 130 of the property status, or may modify the settings of the home control system 100.

The control unit 115 and the monitoring server 120 may exchange information using any one or more of various communication synchronous or asynchronous protocols, including the 802.11 family of protocols, Bluetooth, Bluetooth LE, Z-Wave, ZigBee, GSM, 3G, 4G, 5G, LTE, CDMA-based data exchange or other techniques. The camera 125 connects to the home security system and may be installed on the wall or any other appropriate places of the property 102. The camera 125 may communicate with the augmented reality device 140. For example, the camera 125 may collect image or video data in the home property and send the data to the augmented reality device 140 for processing.

The augmented reality image may be displayed on a wide variety of displays, or directly into the user's eyes, usually through glasses or a headset. Other augmented reality devices include smartphones and tablets. The resident 130 can hold these types of devices in their hands and view the display of the smartphone or tablet. The augmented device 140 processes the image data that collected by the embedded camera, and determines the locations of the devices shown in the view and augments the images of the devices. Multiple cameras may be built in the augmented reality device 140, to perform depth sensing, pictures recording, videos recording, to assist with augmentation processing, etc.

In stage A, the resident 130 may view an augmented reality device 140, for example, by wearing an augmented reality headset. Upon activation of the augmented reality device 140, the augmented reality device 140 receives data from embedded cameras and sensors. The augmented reality device 140 may also collect data from the home security system components, for example, the sensors 105 and camera 125.

In stage B, the resident 130 may look at a specific area and the augmented reality device may identify a home electronic device in the field of view of the camera of the augmented reality device 140. For example, the resident 130 may walk around the home and stop in front of a ceiling light 150, or a stereo system 160. The augmented reality headset 140 may capture the ceiling light 150 or the stereo system 160 using its embedded camera. The home security system components, e.g., the sensor 105 and camera 125, may also capture the movement of the resident 130 and generate a corresponding path and a corresponding location of augmented reality device 140 at home, and send the information to the augmented reality device 140 for processing. The data may be processed and the augmented reality device 140 may project the home electronic device in the augmented view. In another example, the resident 130 may be sitting in the coach and turn his head in a certain direction. The orientation and angle data, as well as the resident 130's location data may be obtained by the home security system components, e.g., the sensors 105 and camera 125, and is transferred to the augmented reality device 140 for processing.

In stage C, the augmented reality device 140 may generate an augmented view for the resident 130. The augmented view may be shown on the augmented reality device 140. In some implementations, the augmented reality device projects a corresponding augmented view in front of the resident 130.

In stage D, the resident 130 may perform a pre-determined user action on the home device control. In some implementations, the resident 130 may look at a ceiling light 150. The augmented reality view may include several home electronic devices for example, the ceiling light 150 and other devices. The resident 130 may move his eyeballs and focus on a specific home electronic device, for example, the ceiling light 150. The resident 130 may blink his eyes twice as a pre-determined action to select the ceiling light 150 from the augmented view. The ceiling light 150 is selected and shown on the left side of the augmented view. The augmented view 135 may also include additional operation options that list on the right side of the augmented view 135. The control options may include light switch, intensity change higher, intensity change lower, timer switch on or off, and light color change etc. An example is shown in augmented view 135 where the ceiling light is selected and additional control options are also listed on the right side of the augmented view 135.

The resident 130 may move his eyeballs, focus on a specific operation option on the augmented view and blink eyes twice to trigger that option. For example, the resident 130 may look at the right side operation options on augmented view 135 from top to down and stop at the option of turning light intensity higher, and then blink eyes twice. This blinking action may be captured by the built-in cameras of the augmented reality device 140 and sent to the embedded augmented reality device processors for processing. The blinking action may be matched to a pre-determined action. In this stage D, the double eye blink motion may be pre-determined as an action of selecting a specific option of controlling the home device, and the option selection confirmation may be sent from the augmented reality device 140 to the control unit 115.

The resident 130 may perform a physical action that is detected by the augmented reality device 140 and perform an action that corresponds to the physical action. For example, the resident 130 may be looking at the ceiling light 150 while wearing the augmented reality device 140 or while the ceiling light 150 is in the field of view of a handheld device. The resident 130 may flick his hand, which may be a pre-determined action to turn on the ceiling light 150. This flicking action may be captured by the camera of the augmented reality device 140 or the handheld device. The augmented reality device 140 or the handheld device may identify the action and determine that it corresponds to turning on the ceiling light 150. The augmented reality device 140 or the handheld device may transmit an instruction to the control unit 115 to turn on the ceiling light 150.

In some implementations, the resident 130 may turn his head to the corner of the home that includes a stereo system 160. The augmented reality view may include several home electronic devices, for example, the stereo system 160 and other home electronic devices. The resident 130 may move his eyes and focus on a specific home electronic device, for example, the stereo system 160 in the augmented view. The resident 130 may then blink his eyes twice as a pre-determined action to select the stereo system 160 in the augmented reality view 165. The stereo system 160 may be selected and shown on the left side of the augmented view 165, with additional operation options listed on the right side in the augmented reality view 165. The control options may include power switch, audio on or off, volume up or down, channel change, CD change and other setting.

The resident 130 may move the view, focus on a specific operation, and blink his eyes twice to select the corresponding option. For example, the resident 130 may look at the operation options on the right side of the augmented view 165 from top to down and stop the view at the options of volume up, and then blink his eyes twice. This blinking action may be captured by the built-in augmented reality device cameras and sent to the embedded augmented reality device processors for processing. The blinking action may be matched to a pre-determined action. In this stage D, the double eye blink may be pre-determined as an action of selecting a specific option of the home electronic device, and the option selection confirmation may be sent from the augmented reality device 140 to the control unit 115.

Another example of a physical action that the resident 130 may perform includes the resident turning his wrist in a similar manner to adjusting a dial. Similar to the example where the resident 130 flicks his hand, the resident 130 may turn his wrist while looking at the stereo system 160 through the augmented reality device 140 or while the stereo system 160 is within the field of view of a handheld device. A camera of the augmented reality device 140 or the handheld device may capture the movement. The augmented reality device 140 or the handheld device may perform video analytics to determine that the movement is the resident 130 is the resident turning his wrist. In some implementations, the resident's wrist may not be within the field of view of the augmented reality device 140 or the handheld device. In this instance, a sensor 105, such as a camera, motion detector, or other device, of the security system 100 may capture the resident's movement. The control unit 115 may perform analytics similar to the analytics performed by the augmented reality device 140 or the handheld device when the movement is within the field of view of the augmented reality device 140 or the handheld device. The augmented reality device 140, the handheld device, or the control unit 115 may determine that the performed action is a wrist turn, which corresponds to a volume adjustment on the stereo system 160. The augmented reality device 140, the handheld device, or the control unit 115 may instruct the stereo system 160 to adjust the volume.

The home appliance control system 100 may include an augmented reality user authentication process to allow only specific group of users to operate the home electronic device through the control system, as shown in stage E. For example, the augmented reality device 140 may perform an iris scan on resident 130 once the resident 130 has selected corresponding operation actions. In some implementations, the iris scan result reveals the resident 130 is an authorized user and allowed to perform the action in the system. The certification of user access may be sent to the control unit 115 through network 110, and control unit 115 may be able to execute the user's command through sending instruction to the home electronic device. In some implementations, the iris scan result reveals the resident 130 is not an authorized user and the augmented reality device 140 may send the unauthorized information to the control unit 115. Once received the unauthorized user information, the control unit 115 may prevent transfer of the execution command from the augmented reality device 140 to the home electronic device.

In stage F, once the user authentication completed, the control unit 115 may forward the instructions from augmented reality device 140 to the home electronic device to execute the instructions. For example, the resident 130 may look at the ceiling light 150 and select the intensity higher option as the control option in the augmented reality view 135. The operation instruction of turning the light intensity higher will be transferred from augmented device 140 to control unit 115. After the resident 130 is authenticated, the control unit 115 may deliver the instruction to the ceiling light 150 through network 110 and increase the ceiling light intensity. In another example, the resident 130 may look at the stereo system 160 and select the volume up option as the control option in the augmented reality view 165. The operation instruction of increasing the volume will be transferred from augmented device 140 to the control unit 115. After the resident 130 is authenticated, the control unit 115 may deliver the instruction to stereo system 160 through network communication 110 and increase the stereo system volume.

Home security is generally used within a house or the home property range to detect threats or endures to the safety or assets of residents. Such systems typically include a number of sensors places within the secured area. The sensors may include fire detection device, door/window break in detection devices, instruction detectors or any combination of such devices. Implementing of augmented reality device to home security brings in tremendous advantages on enabling quick, silent, and secure actions to the home resident and free the resident from life threatening circumstances.

Figure 2:
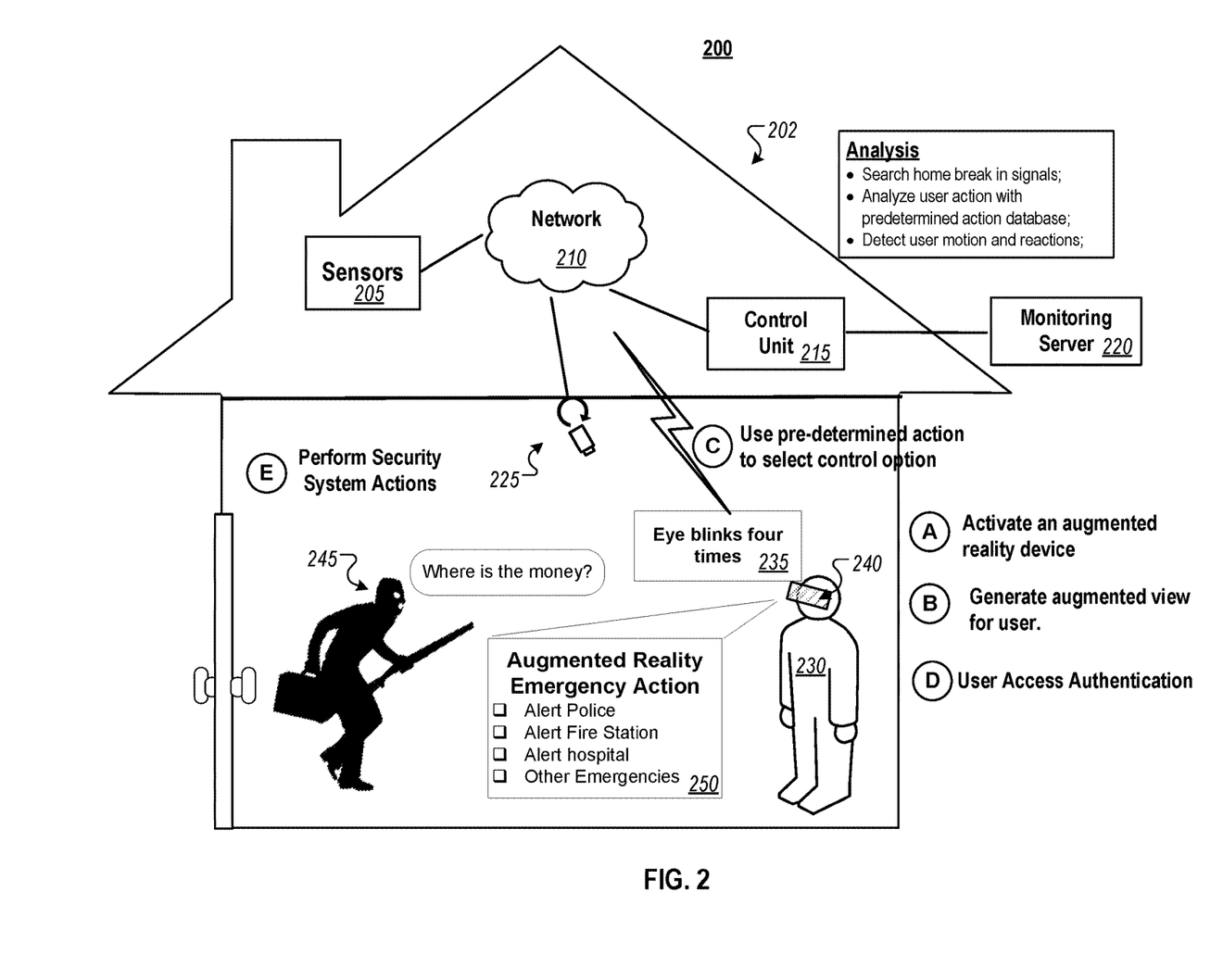
FIG. 2 is a diagram illustrating an example of a home security control system that utilizes an augmented reality device used by the home resident.

FIG. 2 is a diagram illustrating an example of a home security control system 200 that utilizes an augmented reality device that is used by the home resident. In FIG. 2, the property 202 is equipped with a home emergency control system that includes various sensors 205, a network 210, a control unit 215, a monitoring server 220, and a camera 225.

The sensors 205 may detect and collect sensor data related to the activity of the resident 230. For example, motion sensors collect motion data and provide the motion data to the control unit and/or the monitoring server 220. In some implementations, the sensors 205 may indicate the status of property 202. For example, that a door/window sensor may indicate a door or window is open and/or has been broken. In some implementations, the sensors 205 may detect fire or an earthquake. For example, a vibration sensor and thermal sensor may detect vibrations associated with an earthquake or heat and smoke associated with a fire.

The sensors 205 communicate with the control unit 115, possibly through a network 210. The network 210 may be any communication infrastructure that supports the electronic exchange of data between the control unit 215 and the sensors 205. In some implementations, the sensors 205 may communicate with the augmented reality device 240 through the network 210.

The home security system 200 may be able to send alerts to entities not directly associated with the home property 202. For example, the home security system 200 may send a fire alarm to a nearby fire station, send a home intrusion alarm to a nearby police station, or send a life-threatening emergency alarm to a nearby hospital. The home security system 200 connects with sensors 205, the camera 225, and an augmented reality device 240 through the network 210 and uses data collected from those devices to generate the alarms.

There may be a monitoring server 220 located outside of the property 202 and connected with the control unit 215. The monitoring server 220 may be, for instance, one or more computer systems, server systems, or other computing devices. In some implementations, the monitoring server 220 may be a cloud computing platform. The monitoring server 220 provides various monitoring services to the system 200. For example, the monitoring server 220 may monitor the home property 202 for emergency or alarm conditions, may provide notifications to the resident 230 regarding the property status, and/or may modify settings of the home security control system 200.

The home security control system 200 may include an augmented reality device 240 that generates an augmented reality view to the user 230, and allows the user to take quick, silent, and secure actions in responding to an emergency at the property.

In stage A, the resident 230 wears and interacts with an augmented reality device 240, for example an augmented reality headset. The augmented reality device 240 may have embedded cameras and communicate with home security system 200. The augmented reality device may project an augmented view into the eyes of the resident 230.

In some implementations, the augmented reality device 240 may detect a robber 245 break in the home. The augmented reality device may record an image that includes the robber, the weapon and the actions. The embedded processors in the augmented reality device 240 may identify that the person shown in the view is a stranger, the object the person holding is a weapon, and the actions of the person are suspicious, and then determine that the person is likely a robber 245.

In some implementations, the home security system sensors 205 may detect a break in. Sensor data may be captured by the home security system sensors 205 and transferred through the network 210 to the control unit 215. The control unit 215 may analyze the sensor data and determine that a particular event has likely occurred at the property 202. For example, the home security system camera 225 may record a stranger's threat action. The camera 225 may transmit the image data to the control unit 215 to analyze the image data. The camera 225 may also analyze the image data itself. Based on the analysis, the control unit 215 and/or the camera 225 may determine that the robber 245 has likely entered the home. The analysis may include performing video analytics and facial recognition to determine that the robber 245 is not a resident or authorized visitor of the property 202. In other instances and based on the analysis, the control unit 215 and/or the camera 225 may determine that a person may have been restrained such as by being tied up with a rope.

The control unit 215 may transmit a signal to the augmented reality device 240 indicating that there is a potentially dangerous situation in the property 202. The signal may indicate a likely location of the dangerous situation such as the location of the robber 245 or a likely location of the threatened person. The signal may also indicate a description of the threat such as "intruder" or "restrained person."

In stage B, the augmented reality device 240 may generate an augmented view 250 for the user. For example, the augmented reality device 240 may generate the augmented view 250 that includes emergency action options for various emergencies include alert police, alert fire station, alert hospital and other emergencies. The augmented view 250 may be overlaid with an image of the home property taken by the embedded camera of the augmented reality device 240. A picture of the robber 245 could be included in the overlaid image and sent back to the augmented reality device 240 for processing. The augmented reality device 240 may identify the robber 245 in the image, and include information related to the robber 245 as well as the corresponding action options in the augment view 250 for the resident 230.

The resident 230 may move his eyeballs to focus on a specific emergency option and blink his eyes twice to trigger that option. For example, the resident 230 may look at the emergency actions list from top to down and stop at the options of alert police, and blink his eyes twice. This blinking action may be captured by the built-in augmented reality device cameras and sent to its processor to match to a pre-determined action. In this stage C, the double blink may be pre-determined as an action of selecting a specific option of alerting the police, and the selection may be sent from the augmented reality device 240 to the home security system.

In some implementations, the resident 230 may be in duress but the home security system 200 does not detect the duress situation. The resident 230 may blink his eyes four times while looking at a specific area of the augmented reality headset 235. This action may be a predetermined action that will trigger the home security system to perform an action such as alerting the police, sounding an alarm, or another emergency action. Additionally or alternatively, the resident 230 may look at a security panel on the wall while wearing the augmented reality device 240 and blink his eyes for four times. This action may be predetermined to trigger an actions related to a duress emergency in the property 202.

In an optional stage D, the home security control system 200 may perform a user authentication process to allow only a specific group of users to perform actions through the augmented reality device 240. For example, the augmented reality device 240 may perform an iris scan of the user before or after the user has selected an emergency action. In some implementations, the iris scan result reveals that the resident 230 is an authorized user and allowed to initiate an action through the augmented reality device 240. The authentication of user access may be sent to the home security system through network 210. In some implementations, the iris scan result reveals the user is not an authorized user and home security system will not initiate the emergency action instruction.

In stage E, once the home security system receives the emergency action instruction from the augmented reality device 240, it may perform the security actions accordingly. For example, the home security system may activate a siren to drive away the robber 245. The home security system 200 may contact the nearby police station and report an emergency at the property 202. The home security system may send a notification to a pre-determined list of contacts to alert them that an emergency is happening on the property.

Through the operations from stage A to E, the resident 230 is able to transmit a duress signal in a quick, silent, and secure way without revealing the action to the robber 245.

Figure 3A:
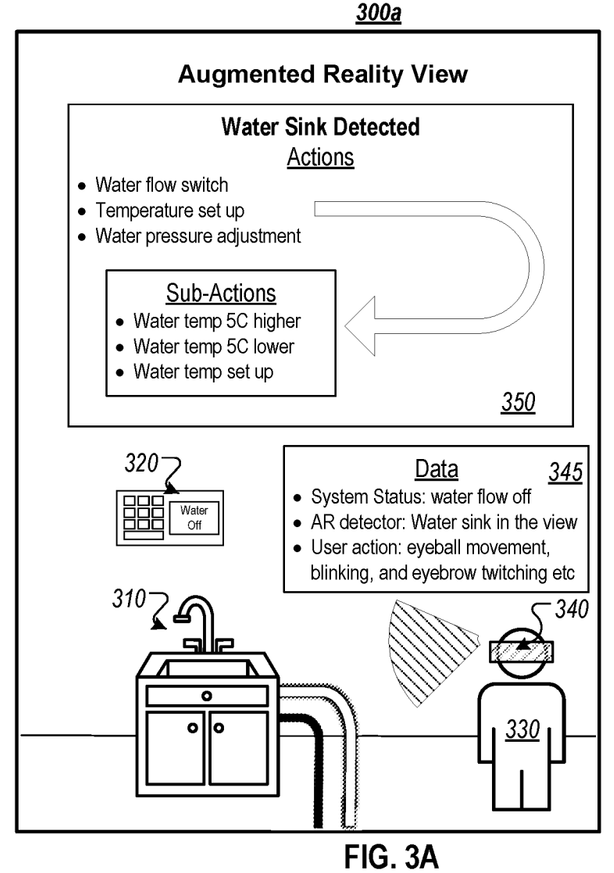
FIG. 3A is a diagram illustrating an example of a home plumbing control system that utilizes an augmented reality device used by the home resident.

FIG. 3A is a diagram illustrating an example of a home plumbing control system 300a that utilizes an augmented reality device 340 by the resident 330. In FIG. 3A, the system 300 includes a sink 310, a control panel 320 and an augmented reality device 340. The control panel 320 may communicate with sensors that are integrated with a water flow control unit and a temperature control unit. The control panel 320 may report the current water temperature setting and the current water flow measured in the sink 310 to the augmented reality device 340.

The resident 330 may wear the augmented reality device 340, for example a headset, and look at the sink 310. The resident may also point a mobile phone executing augmented reality software at the sink 310. The augmented reality device 340 may identify the objects in the field of view of the camera and determine that the sink 310 is within the field of view. The augmented reality device 340 and the control panel 320 may communicate, and the augmented reality device 340 may indicate that the sink 310 is in the field of view. The control panel 320 may access data from the flow control unit and the temperature control unit and transmit this data to the augmented reality device 340. The augmented reality device 340 may generate an interface that includes data related to the temperature setting of the faucet at the sink 310 and the rate of any water flowing through the faucet at the sink 310. The interface may also include actions that the resident 330 can perform such as adjusting the water temperature or adjusting the flowrate.

While the resident 330 is looking at the sink 310 through the augmented reality device 340 and the augmented reality device 340 is presenting the water status and control information through an interface, the resident 330 may select a control option on the interface. For example, the interface may include an option to increase the temperature of the water by five degrees and degrease the temperature of the water by five degrees. The increase option may be in the upper right of the interface and the decrease option may be in the lower right of the interface. The resident 330 may move his eyes to the upper right corner of the interface and blink twice. This action may be detected by the augmented reality device 340. The augmented reality device 340 may communicate the increase temperature instruction to the control unit, which communicates the instruction to the temperature control unit. The augmented reality device 340 may also communicate the increase temperature instruction directly to the temperature control unit.

In some implementations, the augmented reality device 340 may include some control options that may not be included on the interface. For example, the resident 330 may point the augmented reality device 340 at the sink 310. The augmented reality device 340 may display the temperature control interface. Instead of looking at either the temperature control options, the resident 330 may look elsewhere on the interface and blink three times. This control option may be pre-associated with turning the water on and off. If the water is on, then blinking three times will turn the water off. If the water is off, then blinking three times will turn the water on. In instances where augmented reality device 340 does not present the temperature control interface, the on/off control may still be available to the resident 340 through the augmented reality device 340.

Another example of a physical action that the resident 330 may perform includes the resident making a similar action to turning on or off the water to the sink 310. This action may be captured and processed in a similar manner to the resident turning on a light by flicking his wrist or turning his wrist to adjust the volume of a stereo. In this example, the resident 330 may be looking at the sink 310 while wearing the augmented reality device 340. The resident 330 may perform an action similar to turning on a faucet. The action may be within the field of view of the augmented reality device 340 or another sensor. The augmented reality device 340 may perform analytics on the image data to determine that the resident 330 performed an action similar to turning on the faucet. The analytics may be able to determine the direction that the user is making the motion. For example, turning to the right may be to turn the faucet on and turning to the left may be to turn the faucet off. The augmented reality device 340 may transmit an instruction to the control panel 320 or directly to the faucet to turn on or off the water, depending on the action of the resident 330.

Once the resident 330 selects an operation in the augmented reality view 350, there may be a user authentication process to allow only specific group of users to operate the sink control system 300a. For example, the augmented reality device 340 may perform an iris scan on the resident 330 to determine whether the resident 330 is an authorized user. In another example, the augmented reality device 340 may perform an iris scan on the user and determine that the user is not authorized to operate the sink through the augmented reality device 340. In this instance, the augmented reality device 340 may ignore the selection of the actions and not execute any instructions or send any instructions to the control panel 320.

Figure 3B:
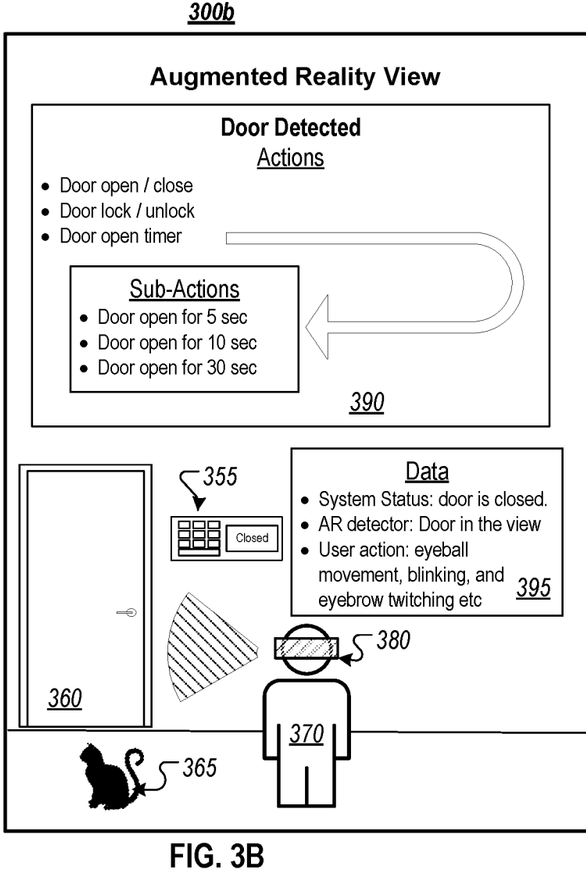
FIG. 3B is a diagram illustrating an example of a home access control system that utilizes an augmented reality device used by the home resident.

FIG. 3B is a diagram illustrating an example of a home access control system 300b that utilizes an augmented reality device used by the resident 370. In FIG. 3B, the system 300b includes a door 360, a control panel 355 on the wall and an augmented reality device 380 that is carried by the resident 370. The door 360 may include embedded sensors and control units that detect the door status and control door operations. In some implementations, the control panel 355 may be installed on the wall and within effective communication distance to the door 360 and augmented reality device 380. In some implementations, the control panel 355 may be installed on the door 360. The control panel 355 may report the door 360 status, for example, the door 360 is closed, to the augmented device 380.

The resident 370 may live with an animal at home, for example, a cat 365. The resident 370 may have limited mobility and cannot manually operate the door 360 to let the cat 365 out. The resident 370 may wear an augmented reality device 380, for example, as an augmented reality headset. In some implementations, the resident 370 may also point a mobile phone executing augmented reality software at the door 360. The augmented reality device 380 may identify the objects in the field of view of the camera and determine that the door 360 is within the field of view. In some implementations, the augmented reality device 380 and the door control panel 355 may communicate, and the augmented reality device 380 may be configured to determine that the door 360 is not in the field of the view but within a threshold distance of the augmented reality device 380 based on signals received from the control panel 355 or the door 360. With the door 360 within the threshold distance, the augmented reality device 380 may operate similarly to the door 360 being within the field of view of the camera. The control panel 355 may access data from the door control units and transmit this data to the augmented reality device 380. The augmented reality device 380 may generate an interface that includes data related to the door 360 status. The interface may also include actions that the resident 380 can perform such as lock the door, unlock the door, and/or keep the door open for a certain amount of time.

While the resident 370 is looking at the door 360 through the augmented reality device 380 and the augmented reality device 380 is presenting the door status and control information through an interface, the resident 380 may select a control option on the interface. For example, the interface may include an option to keep the door open for a certain amount of time. This option may be in the bottom of the interface. The resident 380 may move his eyes to the bottom of the interface and blink twice. This action may be detected by the augmented reality device 380. The augmented reality device 380 may communicate the instruction to keep the door open for the certain amount of time the door 360.

In some implementations, the augmented reality device 380 may include some control options that may not be included on the interface. For example, the resident 370 may point the augmented reality device 380 at the door 360. The augment reality device 380 may display the door control interface. Instead of looking at the door control options, the resident 370 may look elsewhere on the interface and blink three times. This control option may be pre-associated with opening the door for a certain amount of time. In instances where augmented reality device 380 does not present the door status control interface, the door open control may still be available to the resident 370 through the augmented reality device 380.

Similar to the physical actions described above, the resident 370 may make a motion similar to pushing the door open. The motion may be within the field of the view of the augmented reality device 380. The augmented reality device 380 may perform analytics on the video to determine that the action is pushing the door open and determine that action corresponds to opening the door. The augmented reality device 380 may transmit an instruction to the door 360 and/or the control panel 355 for the door 360 to open. The augmented reality device 380 may be able to identify other actions related to the door 360 such as turning the resident's wrist to lock or unlock the door 360. While the action of turning the resident's wrist may be similar to adjusting the volume on the stereo system, the augmented reality device 380 may determine the device that the action corresponds to based on the device within the field of view of the augmented reality device 380.

Once the resident 370 selects an action in the augmented reality view 390, there may be a user authentication process that allows only a specific group of users to operate the home access control system 300b. For example, the augmented reality device 380 may perform an iris scan on the resident 370 to determine whether the resident 370 is an authorized user. In another example, the augmented reality device 380 may perform an iris scan on the user and determine that the user is not authorized to operate the door through the augmented reality device 380. In this instance, the augmented reality device 380 may ignore the selection of the actions and not execute any instructions or send any instructions to the door control panel 355.

Figure 4:
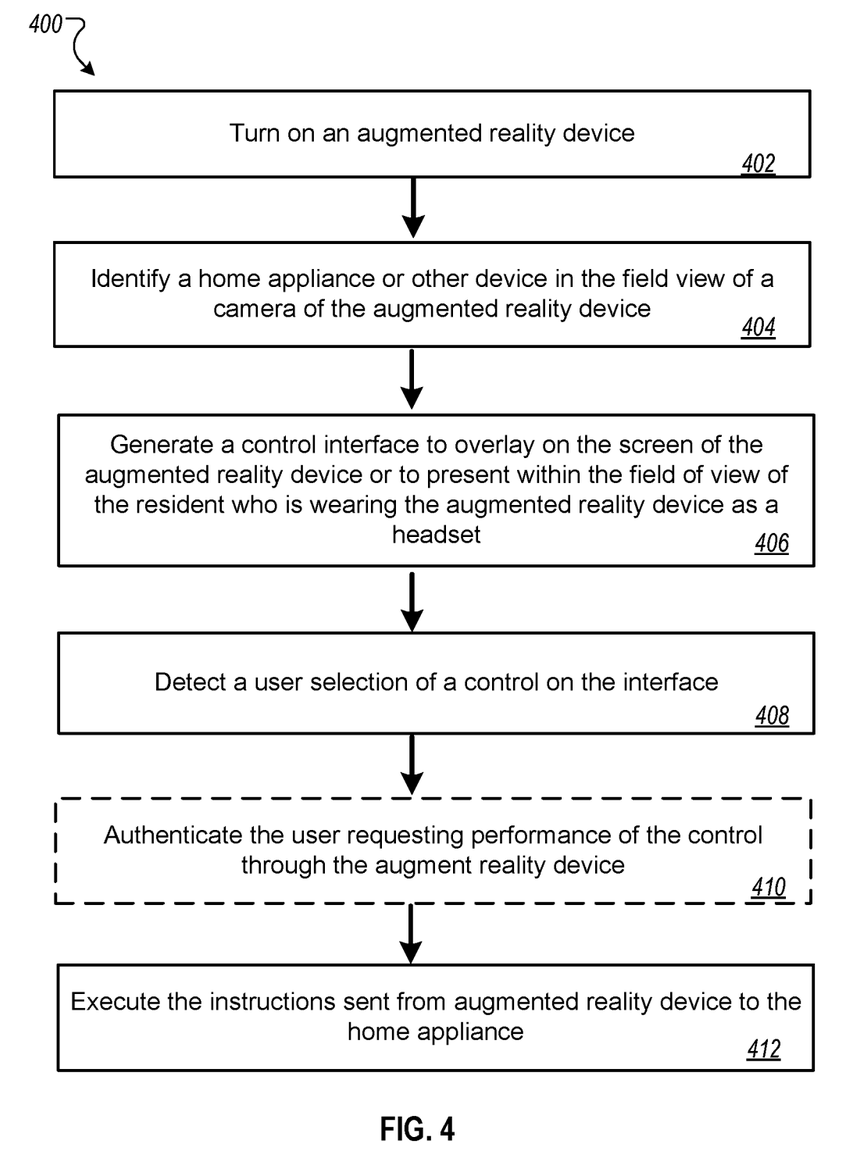
FIG. 4 is a flow chart illustrating an example of a process for utilizing an augmented reality device by home resident for performing monitoring system actions.

FIG. 4 illustrates an example process 400 for utilizing an augmented reality device by resident for performing monitoring system actions. In general, the process 400 involves the resident pointing a camera of an augmented reality device at a particular location of the property. The augmented reality device detects an object within the field of view of the camera and overlays a control interface on the screen. The resident selects control option on the control interface, and the monitoring system executes the corresponding action. The process 400 will be described as being performed by one or more computing devices, for example, the monitoring server 120, the control unit 115, the augmented reality device 140, the monitoring server 220, the control unit 215, the augmented reality device 240, the panel 320, the augmented realty device 340, the panel 355, the augmented reality device 380, and any component illustrated in FIG. 5.

The process 400 includes turning on an augmented reality device in 402. For example, the resident may wear an augmented reality headset and activate the augmented reality headset.

The process 400 includes identifying a home appliance or other device in the field view of a camera of the augmented reality device in 404. For example, the resident may look at a home ceiling light and want to control the light intensity. As another example, the resident may look at a home stereo system and want to adjust the volume. As yet another example, the resident may look at a security panel on the wall and want to send out duress signal out. In some implementations, the augmented reality device may be a device such as a mobile phone. The resident may point the camera of the mobile phone at the home appliance or other device, and the augmented reality device may perform video analytics to determine that the home appliance or another device is in the field of view of the camera.

The process 400 includes generating a control interface to overlay on the screen of the augmented reality device or to present within the field of view of the resident who is wearing the augmented reality device as a headset in 406. The control interface may include controls that are specific to the home appliance or other device that are in the field of view of the camera. For example, the control interface may include controls to turn on, turn off, and/or adjust the brightness of a light.

Alternatively, the process 400 may include generating a user interface (UI) by a virtual reality based electric device, e.g., a virtual reality game console. The virtual reality device may present various control options for a home appliance in the UI by immersing the users into a virtual world. The generating of the UI as well as the control options by the virtual reality device is ignited by identifying a home appliance described earlier in 404. In this example, the virtual reality device encompasses a user's entire field of vision to transport control options listed on the UI to the resident.

The process 400 includes detecting a user selection of a control on the interface in 408. For example, the resident may blink twice at a control for adjusting the brightness of a ceiling light. As another example, the resident may blink twice while looking at a control to adjust the stereo system volume. As yet another example, the resident may blink four times, independent of the control interface, to trigger the home security system to send out duress signal. A front facing camera of the augmented reality device may detect the action of the user. The augmented reality device may translate that action to a selection of a control. In some implementations, the resident may blink twice while looking at a control option showing on a UI of a virtual reality field. Consequently the corresponding control option is selected for executing a home appliance.

The process 400 includes determining that the user is looking at a portion of the field view of the AR device, wherein the portion of the field view includes the home appliance; selecting, by blinking the user's eyes, the home appliance to be shown in the control interface; determining that the user is looking at one of the control options of the selected home appliance; and determining, by blinking the user's eyes, the one of the control options for operating the home appliance. For example, resident 130 may look at a ceiling light 150 and blink his eyes twice as a pre-determined action to select the ceiling light 150 from the augmented view. The ceiling light 150 is then selected and shown on the control interface of the augmented view. The control interface may also include control options including light switch, intensity change higher, intensity change lower, timer switch on or off, and light color change etc. The resident 130 may look at a specific control option by looking at the control option and blinking his eyes. Accordingly, the selected control option will be sent to the ceiling light 150 for execution.

The process 400 optionally includes authenticating the user requesting performance of the control through the augment reality device in 410. For example, the augmented reality device may perform an iris scan on the user and determine if the user is an authorized user.

The process 400 includes executing the instructions sent from augmented reality device to the home appliance in 412. For example, the control unit may adjust the intensity of the home ceiling light to adjust its light intensity or may instruct the ceiling light to adjust its intensity. As another example, the home security system may transmit the duress signal to the police station or other family members.

In some implementations, the process 400 includes triggering the home appliance to perform the operation based on the selection, the triggering of the home appliance includes sending, by the AR device, the selection by the user to a control unit or a server; converting, by the control unit or the server, the selection by the user to operation instructions for the home appliance; and sending, from the control unit or the server, the converted operation instructions to the home appliance. For example, resident 130 may look at the ceiling light 150 and select the intensity higher option as the control option in the augmented reality view 135. The selected control option is then transferred from augmented device 140 to control unit 115. After the resident 130 is authenticated, the control unit 115 converts the selected control option to a corresponding operation instruction for the ceiling light 150. Furthermore, the control unit 115 sends the converted operation instruction to the ceiling light 150 to increase its intensity.

In some other implementations, triggering of the home appliance to perform the operation based on the selection includes directly sending, by the AR device, operation instructions to the home appliance. For example, similar to described above, the resident 130 selects a control option by taken a corresponding action. Once the selecting of the control option is captured by the augmented reality device 140, the augmented reality device 140 directly sends the control option to the ceiling light 150 for execution. The control option is identifiable to the ceiling light 150 and thus used for a direct control of the operations of the ceiling light 150 by the augmented reality device 140.

The process 400 includes detecting a physical action of the user by the camera of the AR device; determining that the physical action of the user matches to a preset action corresponding to the operation of the home appliance; and in response to the determination of the physical action matching to the preset action, executing the home appliance to perform the operation. For example, resident 130 may perform a physical action that is detected by a camera of the augmented reality device 140. As a result, the augmented reality device 140 performs an action that corresponds to the physical action of the resident 130. In this example, the resident 130 may look at the ceiling light 150 and flick his hand, which is a pre-determined action to turn on the ceiling light 150. This flicking action may be identified and determined by the augmented reality device 140 that it corresponds to turning on the ceiling light 150. The augmented reality device 140 then transmits an instruction to the ceiling light 150 to turn it on.

The process 400 includes determining, based on a signal sent from the home appliance and received by the AR device, that the home appliance is within a threshold distance; and in response to the determination that the home appliance is within the threshold distance, identifying the home appliance in the field view of the camera of the AR device. For example, augmented reality device 380 may identify objects in the field of view of the camera of the augmented device 380 and determine that the door 360 is within the field of view. The augmented reality device 380 and the door control panel 355 may communicate, and the augmented reality device 380 may be configured to determine that the door 360 is within a threshold distance from the augmented reality device 380 based on signals received from the control panel 355 or the door 360. In response to a determination that the door 360 is within the threshold distance, the augmented reality device 380 operates the door 360 as being within the field of view of the camera. In this example, the control panel 355 may access data from the door control units and transmit the data to the augmented reality device 380.

The process 400 also includes recording, by the camera of the AR device, image or video data that includes emergency information; in response to the recorded emergency information of the image or video data, generating the augmented view including emergency options for various emergencies; and selecting one of the emergency options shown in the augmented view. For example, the augmented reality device 240 may determine that image or video information collected by a camera of the augmented reality device 240 includes emergency information, e.g., a duress situation. Based on the determined emergency information, the augmented reality device 240 generates an augmented view including options to contact the nearby police station or to report an emergency. The resident 230 then selects one of the options shown in the augmented view for execution.

Furthermore, the process 400 includes performing the selected one of the emergency options by operating a home security system or sending a notification to a pre-determined list of contacts to alert the emergency. For example, as described above, once the resident 230 selects one of the options as a response to the duress situation, the home security system 200 may activate a siren to drive away the robber 245. The home security system 200 may also contact the nearby police station which is on a pre-determined list of contacts and report an emergency at the property 202.

Figure 5:
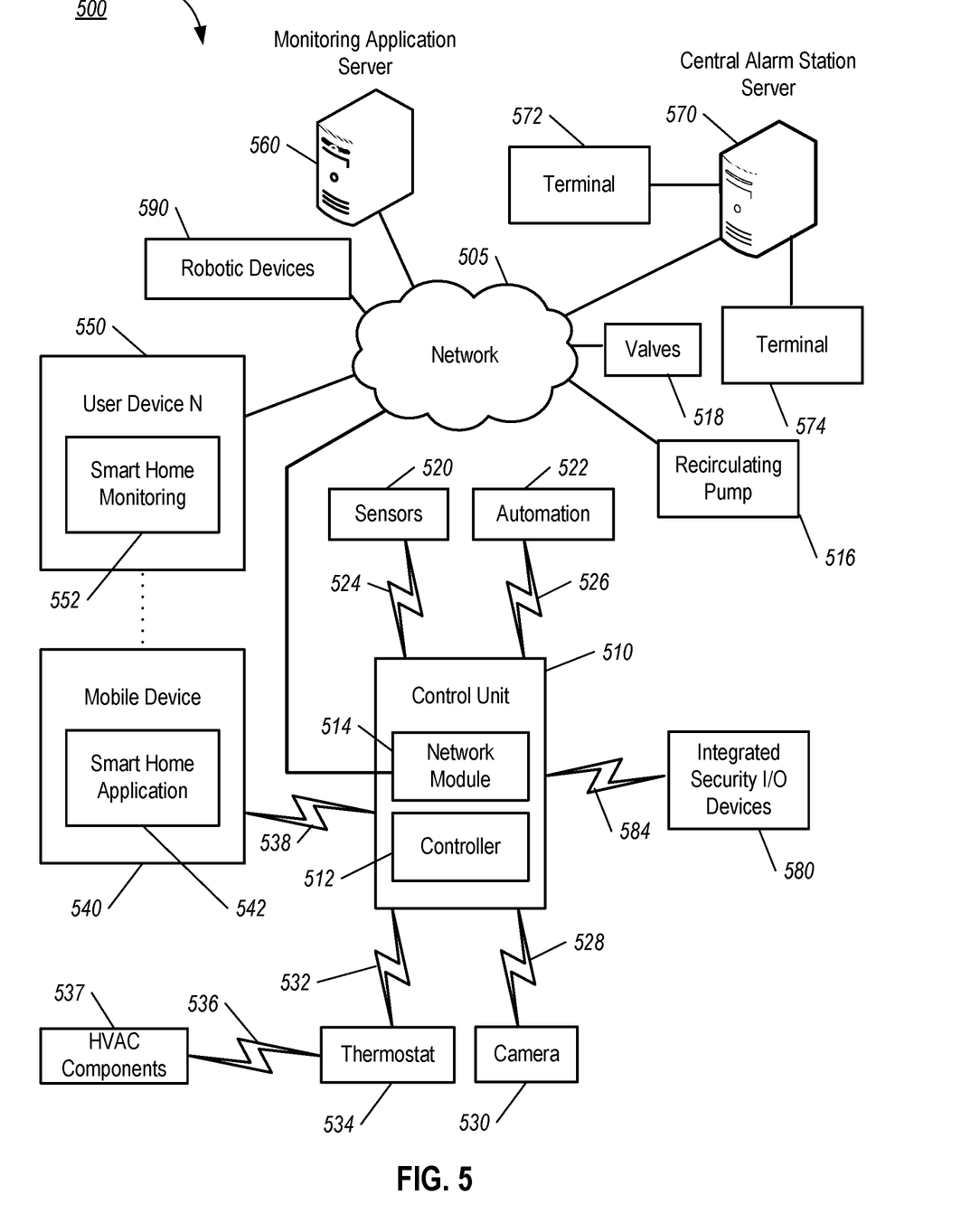
FIG. 5 is a diagram illustrating an example of a property monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network.

The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method, comprising:
    identifying a home appliance in a field view of a camera of an augmented reality (AR) device;
    recording, by the camera of the AR device, image data that includes an emergency situation;
    in response to recording the image data that includes an emergency situation and identifying a home appliance in a field view of a camera of an augmented reality (AR) device, generating a control interface to overlay on a screen of the AR device that includes one or more emergency action options for various emergencies;
    detecting a selection by a user of an emergency action option on the control interface using data indicating user selection with the user's eyes of the emergency action option shown in the control interface; and
    in response to detecting the selection by the user of the emergency action option on the control interface, triggering the home appliance to perform an operation based on the selection.

2. The method of claim 1, further comprising:
    detecting a physical action of the user by the camera of the AR device;
    determining that the physical action of the user matches to a preset action corresponding to the operation of the home appliance; and
    in response to the determination of the physical action matching to the preset action, executing the home appliance to perform the operation.

3. The method of claim 1, wherein the triggering of the home appliance to perform the operation in response to detecting the selection by the user of the emergency action option on the control interface comprises:
    directly sending, by the AR device, operation instructions to the home appliance.

4. The method of claim 1, wherein the triggering of the home appliance to perform the operation in response to detecting the selection by the user of the emergency action option on the control interface comprises:
    sending, by the AR device, the selection by the user to a control unit or a server;
    converting, by the control unit or the server, the selection by the user to operation instructions for the home appliance; and
    sending, from the control unit or the server, the converted operation instructions to the home appliance.

5. The method of claim 1, further comprising:
    determining, based on a signal sent from the home appliance and received by the AR device, that the home appliance is within a threshold distance; and
    in response to the determination that the home appliance is within the threshold distance, identifying the home appliance in the field view of the camera of the AR device.

6. The method of claim 1, further comprising performing the selected one of the emergency action options by operating a home security system or sending a notification to a pre-determined list of contacts to alert about the emergency situation.

7. The method of claim 1, wherein determining that the user blinked multiple times while looking at a particular control option shown in the control interface comprises:
    determining with a second camera in the AR device that the user blinked twice while looking at the particular control option shown in the control interface.

8. The method of claim 1, comprising transmitting, to the AR device, a signal that includes a likely location of the emergency situation.

9. The method of claim 8, wherein transmitting, to the AR device, the signal that includes the likely location of the emergency situation is responsive to determining that the user is an authorized user by performing an iris scan.

10. An augmented reality (AR) device, comprising:
    a camera configured to obtain image data; and
    a processor configured to:
        identify a home appliance in a field view of the camera of the AR device, generate, based on the home appliance that was identified, a control interface to overlay on a screen of the AR device, detect a predetermined action performed by a user of the AR device that is not a selection of any particular control option shown in the control interface, and based on detecting the predetermined action performed by the user that is not a selection of any particular control option shown in the control interface, trigger the home appliance to perform a pre-associated control operation that is not associated with any particular control option shown in the control interface.

11. The AR device of claim 10, wherein the triggering of the home appliance to perform the pre-associated control operation based on detecting the predetermined action performed by the user that is not a selection of any particular control option shown in the control interface comprises:

directly sending, by the AR device, operation instructions to the home appliance.

12. The AR device of claim 10, wherein the triggering of the home appliance to perform the pre-associated control operation based on detecting the predetermined action performed by the user that is not a selection of any particular control option shown in the control interface comprises:

sending, by the AR device, the selection by the user to a control unit or a server;

converting, by the control unit or the server, the selection by the user to operation instructions for the home appliance; and sending, from the control unit or the server, the converted operation instructions to the home appliance.

13. The AR device of claim 10, wherein the processor is configured to:

determine, based on a signal sent from the home appliance and received by the AR device, that the home appliance is within a threshold distance; and in response to the determination that the home appliance is within the threshold distance, identify the home appliance in the field view of the camera of the AR device.

14. The AR device of claim 10, wherein the processor is configured to:

record, by the camera of the AR device, image data that includes an emergency situation;

in response to recording the image data that includes the emergency situation, generate the control interface including emergency action options for various emergencies; and detect a selection by the user of one of the emergency action options shown in the control interface.

15. The AR device of claim 14, wherein the processor is configured to perform the selected one of the emergency action options by operating a home security system or sending a notification to a pre-determined list of contacts to alert about the emergency situation.

16. A non-transitory computer storage medium encoded with instructions that, when executed by one or more computers, cause the one or more computers to perform operations comprising:

identifying a home appliance in a field view of a camera of an AR device;

recording, by the camera of the AR device, image data that includes an emergency situation;

in response to recording the image data that includes an emergency situation and identifying a home appliance in a field view of a camera of an augmented reality (AR) device, generating, a control interface to overlay on a screen of the AR device that includes one or more emergency action options for various emergencies;

detecting a selection by a user of an emergency action option on the control interface using data indicating user selection with the user's eyes of the emergency action option shown in the control interface; and in response to detecting the selection by the user of the emergency action option on the control interface, triggering the home appliance to perform an operation based on the selection.

17. The computer storage medium of claim 16, wherein the triggering of the home appliance to perform the operation in response to detecting the selection by the user of the emergency action option on the control interface comprises:

directly sending, by the AR device, operation instructions to the home appliance.

18. The computer storage medium of claim 16, wherein the triggering of the home appliance to perform the operation in response to detecting the selection by the user of the emergency action option on the control interface comprises:

sending, by the AR device, the selection by the user to a control unit or a server;

converting, by the control unit or the server, the selection by the user to operation instructions for the home appliance; and sending, from the control unit or the server, the converted operation instructions to the home appliance.

* * * * *